Patented Oct. 28, 1952

2,615,783

UNITED STATES PATENT OFFICE 2,615,783

MODIFICATION OF KERATIN

John W. Haefele, Cincinnati, and Nathaniel Beverley Tucker, Glendale, Ohio, assignors to The Procter & Gamble Company, Ivorydale, Ohio, a corporation of Ohio No Drawing. Application August 11, 1950, Serial No. 178,982

18 Claims. (Cl. 8—128)

The present invention relates to the modification of keratin and to the chemical treatment of materials containing keratin such as hair and wool. More particularly the invention relates to an improved process for the conditioning of hair or wool fibers and to the products so produced.

It has been proposed heretofore to treat reduced keratin with substituted or unsubstituted alkyl compounds containing at least two halogens attached to aliphatic carbon atoms to convert sulfhydryl groups into bisthioethers, and particular reference is had to U. S. Patent 2,434,562, issued January 13, 1948 to Harris. In the process of this patent the keratin disulfide is first reacted with a mercaptan, for example, to produce reduced keratin as follows:

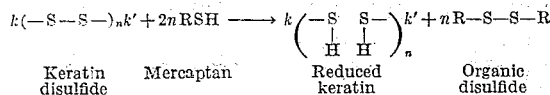

Keratin disulfide    Mercaptan    Reduced keratin    Organic disulfide

The reduced keratin is then rinsed and subsequently reacted with an alkyl dihalide, for example, as follows:

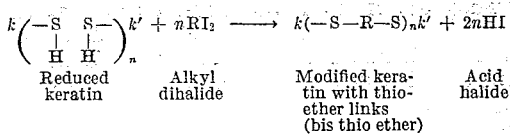

Reduced keratin    Alkyl dihalide    Modified keratin with thioether links (bis thio ether)    Acid halide It is readily apparent that in this process the resulting keratin constituents are chemically combined with the organic radical R through thioether (—S—) linkages rather than through disulfide (—SS—) linkages corresponding to that existing in the original keratin disulfide.

It is an object of our invention to provide a process for the advantageous modification of the chemical and physical properties of keratin-containing substances while at the same time preserving the natural disulfide linkages thereof. It is a further object of the invention to provide such modified keratin-containing substances. Still a further object of the invention is the provision of novel compositions suitable for use in the modification of keratin-containing substances.

In accordance with our invention the above objects are achieved by reacting the reduced keratin with at least one poly-functional organic thiosulfate (organic thiosulfuric acid or water-soluble salt of same) to convert reduced keratin to poly-disulfide containing organic groups of said organic thiosulfate, for example, as follows:

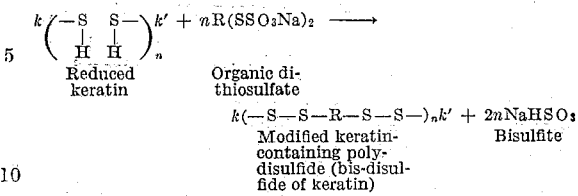

Reduced keratin    Organic dithiosulfate $k(-S-S-R-S-S-)_nk' + 2n\text{NaHSO}_3$ Modified keratin-containing poly-disulfide (bis-disulfide of keratin)    Bisulfite Methods of preparing organic polythiosulfates of the type contemplated for use in this invention are given by Slator in the Journal of the Chemical Society on page 1286 of volume 85 (1904) and on pages 93–103 of volume 95 (1909).

In the above formulas and reactions R represents an organic radical and the keratin molecule has been illustrated by the following simplified formula understood by those versed in the art:

in which $k$ and $k'$ are polypeptide chains which are the same or substantially similar in nature and which are connected through the disulfide (—S—S—) linkage, and $n$ is a number greater than 1.

It will be observed from the above that in the products of my invention, at least some of the disulfide linkages of the original keratin have been disrupted and changed to disulfide linkages of the type

wherein each organic R group, which can be a substituted or unsubstituted bivalent saturated or unsaturated radical, is connected to each of the polypeptide chains $k$ and $k'$ through a disulfide linkage, $n$ being a number greater than 1. Thus two polypeptide chains may be cross-linked through disulfide linkages joined by the organic group R. This cross-linking is conducive to greater fiber strength.

In the treatment of a reduced keratin of human hair in accordance with our invention we have found that reaction with organic dithiosulfates gives a natural luster and feel to the hair and results in excellent fiber strength. Moreover, in the treatment of reduced keratin of wool, improved smoothness of surface finish and improved shrink resistance are achieved by the process.

The fact that chemical reaction takes place between the sulfhydryl groups of the reduced keratin-containing substance and the poly-functional thiosulfate (the term "thiosulfate" including both acid and water-soluble salt of same) is demonstrated by the permanent increase in weight of the keratin-containing substance resulting from the treatment.

The advantageous effect of the modification in chemical structure by this invention can be shown by two measurable tests, one relating to increased strength of the fibers over that observed in treatment with mono-functional thiosulfates or mono-functional or bi-functional halides, attributed to restoration in modified form of cross links in the molecule of the type $k(-S-S-R-S-S-)_{n}k'$, the other relating to a reduction in shrinkage during washing in aqueous soap solutions.

In the determination of the strength of hair fibers an apparatus known as the Scott IP 2 serigraph was used. This instrument is designed to record the stretch of keratin-containing fibers by the application of a uniformly increasing load. The ratio of the load required after modification of the fibers to the load required before modification to stretch a wet strand of 12 fibers 20% (or 30%) of original length is referred to as the "20% (or 30%) index," the higher the index, the stronger the fiber. The instrument is equipped with two clamps between which the strand of 12 fibers of keratin-containing substance is mounted. The strand is surrounded by a water saturated wicking arrangement which keeps the hair wet during stretching. One of the clamps is fixed to a bar which inclines at a uniform rate when the machine is in operation, and the other clamp is attached to a weighted carriage adapted to travel along the bar and away from the first mentioned clamp when the bar is inclined. As the inclination of the bar increases, the stretch load applied by the carriage increases at a uniform rate and the strand of fibers is elongated. The relation between load and elongation is continuously recorded on a chart by a pen fixed to the moving carriage.

When the elongation of the strand reaches 20% (or 30%) of the original strand length, the machine is reversed, and the bar slowly and uniformly returns to horizontal position. With decrease in load, the strand contracts, usually at a rate less than the rate of elongation, thereby forming a hysteresis loop on the chart. The load required to effect 20% (or 30%) stretch can be read from the chart.

In the determination of the reduction in shrinkage of wool during washing as effected by modification in accordance with our invention, the following procedure was used. A swatch of alcohol extracted wool flannel cloth, six inches square, was first treated by the process of our invention then washed under standardized conditions, along with a six inch square swatch of the untreated, alcohol extracted cloth. The washing procedure was conducted in a model H46 Easy washer, one-pound size, and included laundering for 40 minutes at 115° F. with 15 liters of a 0.4% solution of a commercially available coconut-tallow laundry soap (sold under the trade name Oxydol), draining off the soap solution, and agitating the washed swatches with 15 liters of rinse water at 115° F. for 20 minutes. The rinse water was drained off. The swatches were given a spin drying, then allowed to dry in air. The conditions chosen for this test were designed to effect in one wash an amount of shrinkage which would be observed only after a number of washings under normal conditions.

The following examples will point out details of the practice of our process but it is to be understood that the scope of the invention is not to be determined by these examples but rather by the appended claims. Parts are by weight.

*Example 1.*—Strands of 12 human hairs each were cemented at both ends. Each strand was reduced for 21 hours at 100° F. in a 0.5 molar solution of potassium thioglycolate at a pH of 4.5. After reduction each strand was rinsed thoroughly in water and then soaked for 16 hours at 100° F. in 1% solutions of the following dithiosulfates: methylene dithiosulfate, dimethylene dithiosulfate, trimethylene dithiosulfate, and tetramethylene dithiosulfate.

For comparison a similar strand of reduced hair was treated with trimethylene dibromide substantially in accordance with Patent 2,434,562.

The resulting strands were tested in the Scott serigraph to determine the index as described above. In every case that strand of reduced hair which had been treated with the poly-functional thiosulfate was markedly stronger than the strand treated in accordance with the prior art.

*Example 2.*—Swatches of wool flannel, through which were threaded hair strands, each made up of 12 human hairs, were subjected to reduction by contact with the following solution for 30 minutes at 100° F.:

Mercapto ethanol _____ 2 parts
Dithiodiethanol _____ ½ part
Ammonium sulfite _____ 1 part
Ammonia and water to 100 parts and pH 9.3

After the reduced samples had been rinsed thoroughly for one hour in running water, they were then treated for 6 hours at 100° F. with 2% solutions of the following dithiosulfates: dimethylene, trimethylene, tetramethylene, pentamethylene, hexamethylene, and triglycol dithiosulfates. The resulting swatches were rinsed in water to remove dithiosulfate solution and with the aid of the serigraph a 20% index was determined on the hair strand which had been threaded through the swatch.

Shrinkage data on the swatches were obtained in accordance with the washing procedure above described.

The 20% index figure obtained on the hair strands indicated that in all cases little damage to the hair had been effected by the treatment, and that the strands possessed excellent tensile strength.

The shrinkage data on the wool swatches indicated that at least 50% reduction in shrinkage had been effected by the treatment when comparison was made with a corresponding washed untreated wool swatch.

Actual data obtained are summarized below:

| Dithiosulfate | Hair, 20% Index | Area Shrinkage in Washing |
|---|---|---|
| Dimethylene | .87 | 25 |
| Trimethylene | .85 | 20 |
| Tetramethylene | .84 | 19 |
| Pentamethylene | .82 | 14 |
| Hexamethylene | .80 | 5 |
| Triglycol [1] | .87 | 11 |
| Orig. wool | 1.0 | 47 |

[1] The chemical formula for triglycol dithiosulfate is:
$NaO_3SS-CH_2-CH_2-O-CH_2-CH_2-O-CH_2CH_2-SSO_3Na$ Comparative alkali solubility data as determined by treatment of the wool swatches for one hour at 65° C. with a 0.1 normal sodium hydroxide solution indicated little or no degradation of the keratin by the treatment.

In place the dithiosulfates used in the above example, the following polythiosulfates can be substituted with substantially the same results:

propylene dithiosulfate

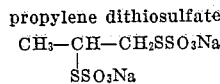

trisodium glyceryl trithiosulfoacetate

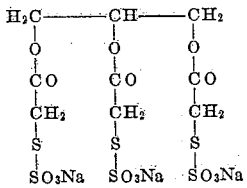

*Example 3.*—This example deals with a one-step treatment of wool and hair with a solution containing both a reducing agent and a bifunctional thiosulfate.

Wool swatches, through which had been threaded strands of human hair as in Example 2, were exposed to the following solutions A and B:

| Ingredient | Solution | |
|---|---|---|
| | A | B |
| NaHSO₃ ................................ parts.. | 5 | |
| Thiourea peroxide ..................... do.... | | 3 |
| Trimethylene dithiosulfate ........... do.... | 3 | 3 |
| NH₃ (28%) ............................. | | To pH 8 |
| H₂O .................................. parts.. | 92 | To 100 |

After 16 hours' exposure to the solutions at 120° F., the wool swatches with threaded hair strands were rinsed one hour in running water, and then extracted with alcohol.

In both instances of treatment the 20% index figure determined with the aid of the serigraph on the hair strands indicated little or no damage and good tensile strength, and washing tests on the wool swatches, as compared with a corresponding swatch of the original untreated wool, indicated a reduction in shrinkage of well over 50% in both cases. In fact, the shrinkage by treatment with solution A was only about 7% as compared with 39% for the original untreated wool.

The invention as exemplified by the above examples is subject to many variations. For example, the method by which the keratin is reduced to form sulfhydryl groups is not critical in achieving the advantages of our invention, and any of the conventional sulfur-containing reducing agents can be employed. The choice of the reducing agent is of course dependent at least in part on the particular application of the invention. In the treatment of living human hair, for example, it is preferable to use mercaptans such as thioglycerol or ammonium thioglycolate which have been tested and found to be operative with minimum undesirable damage under the conditions of reduction. As used herein, throughout both the specification and the claims, the term "mercaptan" refers to a compound containing the sulfur analogue of an alcoholic hydroxy group, i. e. the thiol group (—SH), attached to an aliphatic carbon atom. In other words, thiophenols are specifically excluded from the scope of the word "mercaptan" which can be considered here as being limited to alkyl, alkenyl, and substituted alkyl and alkenyl thiols. A much wider choice of reducing agent is of course available in the treatment of wool, and inorganic sulfides, hydrosulfides, sulfites, hydrosulfites, as well as hydrogen sulfide and compounds like thiourea peroxide, can be employed with success in addition to the mercaptans.

Time, temperature, concentrations, and other conditions necessary for adequate degree of reduction have already been explored by those versed in the art and discussion of these details here does not seem necessary for a clear understanding of the invention. It is sufficient to say that conditions should be chosen so that at least some reduction of the keratin disulfide is effected without objectionable degradation of the material undergoing treatment. The actual degree of reduction should preferably be controlled in keeping with the amount of organic thiosulfate to be combined with the wool. In those cases, for example, where the introduced organic group has fluorescent, sanitizing, dyeing, etc. properties, a low degree of introduction is adequate and a low degree of reduction is sufficient. In effecting shrink resistance, however, a somewhat greater degree of introduction of the organic group is advisable and the amount of reduction may vary from 5 per cent to completion depending on the degree of shrink resistance desired, which in turn will depend on the nature of the organic thiosulfate and on the amount combined with the wool.

In the practice of the essential step of the present invention, that is, treatment of the reduced keratin with the poly-functional organic thiosulfuric acid or water-soluble salt of same, a wide variety of treating agents can be employed. These may be generically identified as saturated and unsaturated open chain polythiosulfate, the term "thiosulfate" being employed to include the acid (hydrogen thiosulfate) as well as the partially and fully neutralized water-soluble salts. In the case of the acid compounds, for example, the chemical structure may be shown as $R(SSO_3H)_x$ where R is an open chain, substituted or unsubstituted, organic radical and $x$ is 2 to 4.

As far as we are aware, the invention is operative irrespective of the nature of substituent groups of the radical R, whether organic (aliphatic or aromatic) or inorganic, provided the polythiosulfate is water soluble, and it is to be noted that even though substituent groups may include halogen atoms, these halogen atoms are un-ionized and reaction preferentially takes place with ions formed on ionization at the thiosulfate radicals. Thus disulfide linkages are formed in preference to thioether linkages.

Saturated and unsaturated straight chain organic diethiosulfates of alkanes and alkenes such as methylene-, ethylene-, propylene-, butylene-, pentylene-, hexylene-, dodecylene-dithiosulfate, the di- through dodecamethylene dithiosulfates and the dithiosulfate of octadecene are operative, and corresponding compounds having side chains in the organic radical, such as isopropylene and tertiary butylene thiosulfates, can be successfully employed. The number of carbon atoms in the unsubstituted or substituted organic radical can vary over a wide range, provided the poly-functional thiosulfate is water soluble. In this connection dithiosulfates of alkanes having from 1 to 18 carbon atoms in the alkylene radical are soluble in water and are useful in the practice of the invention. Of course a greater number of carbon atoms in the alkylene group can be tolerated when weakly ionized or un-ionized water-solubilizing substituents such as OH, COOH, and NH₂ are present in the radical.

The physical properties of the modified products of our invention will vary depending at least in part on the character of the organic radicals introduced, the nature of the substituent groups showing particular influence. For example, the introduction of an organic group containing a carboxyl radical will in general tend to enhance wettability of the modified keratin-containing substance. Moreover, the use of poly-functional thiosulfates in which the organic radical contains from 12 to 18 carbon atoms, as the treating agent for hair which has been reduced with a mercaptan as in permanent hair waving operations, tends to impart improved luster and feel to the hair. In addition, the process of our invention provides means for effecting changes in the physical properties of wool by the introduction of organic radicals having, for example, fluoroescent or germicidal properties. It is to be noted that in all cases where organic radicals have been combined with the keratin of wool by cross linking through disulfide bonds, increased weight and reduction in the tendency to shrink have been observed.

The process of our invention is conducted in aqueous medium thereby permitting ready ionization of the poly-functional thiosulfate and the sulfhydryl of the reduced keratin, and establishing conditions favoring rapid and complete reaction.

The hydrogen ion concentration of the solution containing the thiosulfate is preferably maintained at a pH from about 7 to about pH 9.5 during contact with the reduced keratin substance, but a wider range of hydrogen ion concentration can be employed such as pH 4 to pH 10.5, provided due precautions are observed as to concentration and temperature of treatment whereby damage and degradation of the keratin-containing substance is held at a minimum. In the case of the treatment of reduced living hair, alkaline conditions effected by the use of ammonia or substituted ammonium compounds are preferred, but in the treatment of reduced wool desired alkalinity can be effected by judicious use of other alkalizing materials such as sodium or potassium hydroxide. Under alkaline conditions, of course, appropriate water-soluble poly-functional thiosulfate salts are preferably used.

The temperature at which the thiosulfate is reacted with the reduced keratin is not critical, room temperature to 100° F. being preferred. However, depending on the stability of the poly-functional thiosulfate, higher temperatures, for example to about 212° F., may be employed, and such temperatures will be found to be advantageous in certain situations wherein a high rate of reaction is desired. If complete reaction between the organic poly-functional thiosulfate and the reduced keratin is desired, the duration of the contact may be determined by periodically subjecting the keratin-containing substance under treatment to the conventional nitroprusside test and continuing contact with the thiosulfate until a negative test for sulfhydryl is obtained. The actual time for the reaction will vary, of course, depending on temperature, concentration, and nature of the thiosulfate.

In the above examples, we have shown that the reaction with poly-functional thiosulfates in accordance with the invention may be conducted separately on reduced keratin or simultaneously with the reducing step by employment of a solution containing both a reducing agent and also the poly-functional thiosulfate. In this latter one-step procedure the reducing agent is available for chemical reduction of the keratin-containing substance to form sulfhydryl groups and the poly-functional thiosulfate is available for reaction with the reduced keratin whereby disulfide linkages are reestablished. In such one-step treatments the use of sulfite, bisulfite and thiourea peroxide reducing agents are to be preferred over mercaptans. Solutions made up of a mixture of such reducing agent and poly-functional thiosulfate find especial use in the practice of this one-step process. In the case of those solutions which are adapted for use in this one-step procedure, the mercaptan and poly-functional thiosulfate must be compatible, that is, all disulfides which are formed in the equilibrium reaction occurring on combination of the poly-functional thiosulfate with the mercaptan should preferably be soluble in aqueous medium at least when reaction with the reduced keratin is effected. Thus, in some instances, as in the case of a solution containing thioglycolate and lauryl thiosulfate, a precipitate of organic disulfide (e. g. lauryl disulfide) forms as a result of reaction of mercaptan with thiosulfate during storage of the solution. If the solution is used before such precipitation occurs, the reaction with the keratin-containing substance proceeds in a normal manner. However, when disulfide precipitates, mercaptan and thiosulfate are consumed and made unavailable for reaction with the keratin-containing substance and modification thereof as taught herein is not effected to the desired degree. However, one-step treatments of keratin-containing substance to form $k(-S-S-R-S-S-)_nk'$ can be successfully carried out with poly-functional thiosulfates whose corresponding disulfides are insoluble, by use of reducing agents which do not react with the poly-functional thiosulfate, which are capable of reacting with the disulfide linkages of keratin to produce sulfhydryl groups but which are non-sulfhydryl themselves, as for example aqueous solutions of thiourea peroxide and water-soluble sulfites and bisulfites, and such treatments, as well as mixtures of such reducing agents with poly-functional thiosulfates suitable for use in the treatments are contemplated as part of the present invention. Gains in weight and resistance to shrinkage, as previously shown, result from treatments in accordance with these latter procedures.

It is our belief that the products of the reaction hereinabove described represent new and useful products in the art, and our belief that organic groups are chemically combined with the keratin through disulfide linkages is supported by reproduced evidence showing (1) a gain in weight and shrink resistance on treatment of wool in accordance with the process, and (2) an improved luster and condition of hair treated in accordance with the process.

Having now described our invention in such manner that the nature thereof may be fully understood by others, we declare that what we claim is:

1. In the process of treating keratin-containing substance to modify chemical and physical characteristics thereof wherein the said substance is subjected to the action of a sulfur-containing reducing agent and the disulfide linkages of keratin are converted to sulfhydryl groups, the step of reacting reduced keratin at a pH of about 4 to about 10.5 with an aqueous solution of at least one organic polythiosulfate of the group consisting of water-soluble polythiosulfates of alkanes and alkenes and substituted alkanes and alkenes to convert reduced keratin to polydisulfide containing the organic group of said organic polythiosulfate.

2. Process of claim 1 in which the reaction of reduced keratin with the polythiosulfate is conducted in an operation separate from the step of reducing the keratin.

3. Process of claim 1 in which the reduced keratin is rinsed substantially free of reducing agent before reaction with the polythiosulfate.

4. Process of claim 1 in which the reaction with the polythiosulfate is continued until sulfhydryl groups are substantially eliminated.

5. Process of claim 1 in which the polythiosulfate is a dithiosulfate of an alkane having from 1 to 18 carbon atoms.

6. Process of claim 1 in which the reduced keratin is reduced wool keratin and the polythiosulfate is a dithiosulfate of an alkane having from 1 to 18 carbon atoms.

7. Process of treating keratin-containing substance to modify chemical and physical characteristics thereof, which comprises contacting the keratin-containing substance with an aqueous solution at pH 4 to pH 10.5 of a mercaptan and more than an equimolar amount of a polythiosulfate of the group consisting of water-soluble poly-thiosulfates of alkanes and alkenes and substituted alkanes and alkenes, and rinsing the solution from the treated keratin-containing substance.

8. Process of claim 7 in which the mercaptan is a thioglycolate and the polythiosulfate is methylene dithiosulfate, and the pH of the solution is from pH 7 to pH 9.5.

9. Process of forming disulfide linkages in reduced hair which comprises treating reduced hair with an aqueous solution of at least one polythiosulfate of the group consisting of water-soluble dithiosulfates of alkanes and alkenes and substituted alkanes and alkenes having from 1 to 18 carbon atoms.

10. Process of claim 9 in which the polythiosulfate is dithiosulfate of dodecane.

11. Keratin-containing fiber in which keratin is cross-linked according to the formula

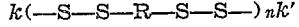

wherein $k$ and $k'$ represent polypeptide chains and R is selected from the group consisting of bivalent saturated and unsaturated organic radicals having from 1 to 18 carbon atoms.

12. Keratin-containing fibers of claim 11 in which R is alkylene.

13. Keratin-containing fibers of claim 11 in which R is dodecylene.

14. Keratin-containing fibers of claim 11 in which R is substituted alkylene.

15. As a new composition a mixture of a sulfur-containing but non-sulfhydryl water-soluble reducing agent for keratin and at least one water-soluble organic polythiosulfate of the group consisting of alkanes and alkenes and substituted alkanes and alkenes.

16. Composition of claim 15 in which the reducing agent is thiourea peroxide.

17. Composition of claim 15 in which the reducing agent is water-soluble sulfite.

18. Composition of claim 15 in which the reducing agent is water-soluble bisulfite.

JOHN W. HAEFELE.
NATHANIEL BEVERLEY TUCKER.

REFERENCES CITED

The following references are of record in the file of this patent:

UNITED STATES PATENTS

| Number | Name | Date |
| --- | --- | --- |
| 2,238,672 | Arthur | Apr. 15, 1941 |
| 2,403,906 | Burke | July 16, 1946 |
| 2,434,562 | Harris | Jan. 13, 1948 |
| 2,483,008 | Higgins | Sept. 27, 1949 |
| 2,508,714 | Harris | May 23, 1950 |

OTHER REFERENCES

Speakman, "The Chemistry of Wool and Related Fibres," Journal of the Textile Institute, July 1941, pages T83 to T108, especially at bottom of page T106.

Speakman et al., "The Reactivity of the Sulphur Linkage in Animal Fibres, Part V," Journal of the Society of Dyers and Colourists, March 1941, pages 73 to 81.

Footner et al., "Reactions of Organic Thiosulphates," Chemical Society Journal, volume 127, July to December 1925, pages 2887 to 2891.

Gilman, "Organic Chemistry," volume 1, Second Edition, 1943, John Wiley and Sons, New York, pages 908 to 910.

Geiger et al., "Chemically Modified Wools of Enhanced Stability," American Dyestuff Reporter, March 1, 1943, volume 32, Number 5, pages 99 to 104.

Patterson et al., "The Role of Cystine," American Dyestuff Reporter, August 18, 1941, volume 30, Number 17, pages 425 to 430 447, 448.